United States Patent
Kaplan et al.

(10) Patent No.: US 6,840,137 B2
(45) Date of Patent: Jan. 11, 2005

(54) BAFFLED VENT SYSTEM FOR USE IN DRIVELINE COMPONENTS

(75) Inventors: Kevin J. Kaplan, Macomb Township, MI (US); Ramon C. Kuczera, Clarkston, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 87 days.

(21) Appl. No.: 09/951,544

(22) Filed: Sep. 11, 2001

(65) Prior Publication Data

US 2003/0047024 A1 Mar. 13, 2003

(51) Int. Cl.[7] .............................................. F16H 57/02
(52) U.S. Cl. .................................................... 74/606 R
(58) Field of Search ....................................... 74/606 R

(56) References Cited

U.S. PATENT DOCUMENTS

| | | | | |
|---|---|---|---|---|
| 3,686,973 A | * | 8/1972 | Davison et al. | ........... 74/606 R |
| 4,498,353 A | * | 2/1985 | Kitade | ....................... 74/606 R |
| 4,554,844 A | * | 11/1985 | Hamano | .................... 74/606 R |
| 4,595,118 A | * | 6/1986 | Azuma et al. | ......... 220/203.27 |
| 4,879,921 A | * | 11/1989 | Asada et al. | ................... 74/467 |
| 4,911,035 A | * | 3/1990 | Taguchi | ........................ 360/70 |
| 4,970,913 A | * | 11/1990 | Kielar et al. | ............. 74/606 R |
| 5,220,854 A | * | 6/1993 | Allart et al. | ............. 74/606 R |
| 5,509,949 A | * | 4/1996 | Gluys et al. | ............... 55/385.3 |
| 6,015,444 A | * | 1/2000 | Craft et al. | ................... 55/320 |

* cited by examiner

*Primary Examiner*—David Fenstermacher
(74) *Attorney, Agent, or Firm*—Jennifer M. Brumbaugh; Mick A. Nylander

(57) ABSTRACT

A vent system for use in a driveline component of an automotive vehicle. The driveline component includes a housing and a cartridge within the housing. The driveline component includes the vent system which has a vent that is secured to the housing at an orifice within a top portion of the housing. The vent system also includes a baffle extending from the housing wherein the baffle is adjacent to the vent orifice. The vent and baffle system also includes a gap that is defined by the baffle, the housing and the cartridge and is of sufficient size to prevent pooling and the forming of a meniscus near the vent assembly. The vent and baffle system is used to allow for venting of high pressures developed during high speed rotation of driveline modules within a drive train system of an automotive vehicle without allowing the expulsion of the lubricating fluid from the oil housing.

20 Claims, 2 Drawing Sheets

BAFFLED VENT SYSTEM FOR USE IN DRIVELINE COMPONENTS

BACKGROUND OF THE INVENTION

1. Technical Field

The present invention relates generally to driveline components and more particularly to a baffled vent system for equalization of pressure in fluid filled enclosures for driveline components.

2. Background Art

Drive train systems have been known for many years in the automotive industry and other industries that require power to be transferred to a driving member. In particular, the automotive industry drive train systems have evolved to the point where a drive train may be an all wheel drive system, four wheel drive system, a front wheel or rear wheel drive system. These systems are connected to an engine which provides the power and then to a transmission which will provide the necessary power transfer to a prop shaft and then to the half shafts and wheels of the automotive vehicle. The prop shafts are connected to driveline components such as, center differentials, rear differentials and front differentials. These driveline components transfer the torque from the engine to each wheel and provide for different speeds of rotation at each wheel depending on the conditions at each wheel. For instance, in a turn the outer wheel spins faster then the inner wheel or if one wheel encounters a slip condition such as found on loose gravel roads, ice or snow than the other wheel has to compensate by receiving more torque to remove the vehicle from the slip condition on the spinning wheel.

Generally speaking, most of the driveline components have parts that rotate at very high speeds and thus have to be bathed in a fluid sump for either cooling or lubrication purposes. With the high rotational velocities, pressure and heat tends to build up within the component hence, a vent is necessary to the atmosphere in many cases. The venting will allow the enclosure to operate at as near to atmospheric pressure as possible to ensure longer life of the seals within the driveline components. There have been many attempts to vent driveline components that are bathed in oil. Many of the prior art configurations include an orifice through the housing and a vent member that works either with a spring or some other type of mechanical device to allow pressure that is being built within the housing of the driveline component to vent to the outer atmosphere. This helps to reduce the pressure and further prolong life of the rotating components and the seals used within the driveline component. Generally, the prior art vents are located on a side or top portion of the housing and vary in shape, size and number used to provide the proper venting of the driveline component.

However, the prior art designs have not addressed all of the problems inherent with venting a system that operates at high speeds and pressures. The driveline components operational speeds are so high that the fluid used to bath and lubricate the components within the housing tends to swirl within the unit. This swirling causes the fluid to be expelled from the vent in the prior art systems. Fluid expulsion sometimes results in reduced durability of the driveline component and the internal components of the driveline component. Furthermore, it allows leaks from the housing which may be perceived by the operator of the automotive vehicle. It should also be noted that once the fluid used to bath and lubricate the internal components of the driveline component is reduced in quantity, the internal temperature will increase thus reducing the longevity and durability of the driveline components sometimes leading to premature failures and unwanted warranty costs for the manufacturers.

Therefore, there is a need in the art for a venting device that is part of a system that will allow the venting of the high internal pressures of the driveline components without losing any fluid through expulsion from the vent.

BRIEF SUMMARY OF THE INVENTION

One object of the present invention is to provide a new and improved driveline component.

Another object of the present invention is to provide a venting mechanism for a driveline component.

Yet another object of the present invention is to provide a vent and baffling system for a driveline component.

Yet another object of the present invention is to reduce the expulsion of lubrication fluid from a driveline component.

It is still a further object of the present invention to create a vent and baffle system that will allow high pressures within a driveline component to be vented to the atmosphere in order to prolong seal life and durability of the internal components of the driveline component.

It is still another object of the present invention to reduce the occurrence of leaks of the lubricating fluid from a driveline component that are perceived by customers of automotive vehicles.

To achieve the foregoing objects a vent system for use in a driveline component for an automotive vehicle is disclosed. The vent system includes a vent secured to a housing of the driveline component. The vent system also includes a baffle extending from the housing wherein that baffle is adjacent to the vent opening of the housing. The vent system also includes a gap defined by the baffle, the housing and a cartridge within the driveline component.

One advantage of the present invention is that it provides a new and improved driveline component for a drive train system.

Another advantage of the present invention is that it provides a venting device for a driveline component that operates under pressure such that the venting device will vent any internal pressure to the atmosphere thus prolonging seal life within a driveline enclosure.

Still another advantage of the present invention is that the vent includes a baffle system that will help to prevent the expulsion of the lubricating fluid from the driveline component.

Still another advantage of the present invention is that it reduces leaks of the lubricating fluid from the driveline component thus, reducing warranty issues from the customer perceiving such leaks.

Still another advantage of the present invention is that the vent and baffle system increases the durability of the drive train component and also increases the durability of the internal parts that are cooled and lubricated by the lubricating fluid.

Still another advantage to the present invention is that it is capable of being designed to specific applications by changing the angle of the baffle with relation to the vent device.

Other objects, features and advantages of the present invention will become apparent from the subsequent description and the appended claims, taken in conjunction with the accompany drawings.

BEST MODE FOR CARRYING OUT THE INVENTION

Figure 1:
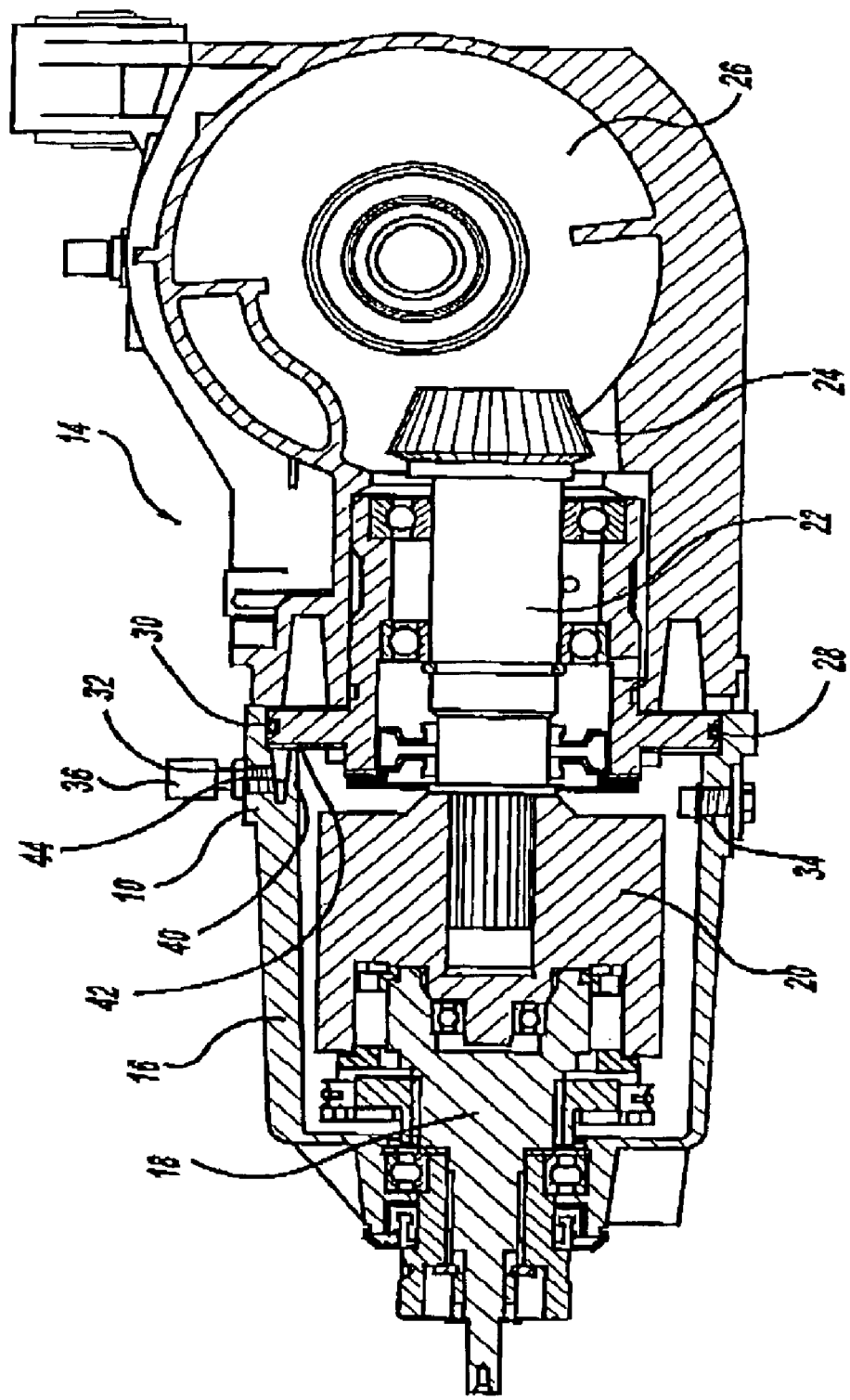
FIG. 1 shows a cross section of a driveline component according to the present invention.

Referring to the drawings, a vent and baffle system 10 according to the present invention is shown. The vent and baffle system 10 is designed primarily for use in driveline components of a vehicle drive train system. The drive train system generally comprises an engine (not shown) that delivers power to a transmission (not shown) or power take off unit (not shown) which connects to a prop shaft that delivers the power to the front and rear differentials 12, which will split that power to half shafts and then onto the wheels of the automotive vehicles. Generally the driveline components may be a center differential, a power take off unit, a rear or front differential, or any of the constant velocity joints or other devices that are used to deliver power to wheels of the automotive vehicle systems throughout the drive train. Many of the driveline components have internal parts that rotate at high speeds and have to be bathed in a lubricating fluid for either cooling or lubrication of the internal parts or seals. With these high speeds, high pressures and temperatures may also develop which makes it necessary to vent the fluid enclosed driveline components to the atmosphere, in order to have near atmospheric pressure achieved within the driveline component thus prolonging seal life of any internal components and the driveline component itself. The present invention is a vent and baffle system 10 that will allow for an exit path for the pressurized gas to equal out the pressure within the driveline component while not allowing the escape of the lubricating fluid from within the driveline housing or enclosure to the outside surface of the driveline component which appears as leaks to a user of the vehicle.

FIG. 1 shows a cross section of a rear wheel driveline module 14 for a motor vehicle. It should be noted that a driveline module may also be appropriate for a front axle of a vehicle or for an all wheel or four wheel drive automotive vehicle. The rear driveline module 14 includes a housing 16. An over running clutch 18 is rotatably supported at one end of the housing 16. The over running clutch 18 is connected to a prop shaft on one end thereof wherein the prop shaft extends from a center differential, power take off unit or transmission. On an opposite end of the over running clutch 18, within the oil housing 16, a viscous coupling 20 is rotatably attached thereto. The viscous coupling 20 is non rotatably connected to a pinion shaft 22 that has a pinion gear 24 on one end thereof. The pinion gear 24 interacts with a ring gear secured to an outside surface of a differential carrier 26 that is arranged within the oil housing 16 of the rear driveline module 14. The pinion shaft 22 is rotatably supported within a front cartridge 28 that engages an inner surface of the oil housing 16. The front cartridge 28 is static with relation to the oil housing 16 and has no rotating parts within the oil housing driveline module 14. The oil housing 16 is bathed in a lubricating fluid and acts as a sump to move that fluid, by the rotation of its parts, across the over running clutch 18, the viscous coupling 20, the pinion shaft 22 to insure proper lubrication of all of the seals that are needed for the moving parts within the driveline module 14. The front cartridge 28 also includes a seal 30 on its outer surface that engages with an inner wall of the oil housing 16. This will prevent any fluid leakages around the front cartridge 28 out of the oil housing 16.

As shown in FIG. 1, the vent and baffle system 10 according to the present invention is located at a top surface of the housing 16. It should be noted that the housing 16 has an orifice 32 therethrough at a top surface of the housing 16. The orifice 32 includes a series of threads within. The housing 16 also includes an orifice 34 at a bottom surface thereof to allow for draining of and changing of the fluid used to lubricate and cool the driveline module 14. It should be noted that the components within the housing 16 are capable of reaching rotational speeds of over 5,000 RPM during operation of the motor vehicle. These high rotational speeds create high temperatures and pressures that require lubrication to maintain a cool and functional environment for the driveline module 14. Furthermore, at these high operational speeds the lubricating fluid has a tendency to swirl within the unit 14 thus causing the fluid to be expelled from any vent or opening if that opening is not properly sealed or baffled. It is this fluid expulsion that can result in reduced durability of the driveline module 14 and the overall drive train system. Furthermore, any leaks that are perceived by the customer increases costs and overall satisfaction by the automotive vehicle operator.

Figure 2:
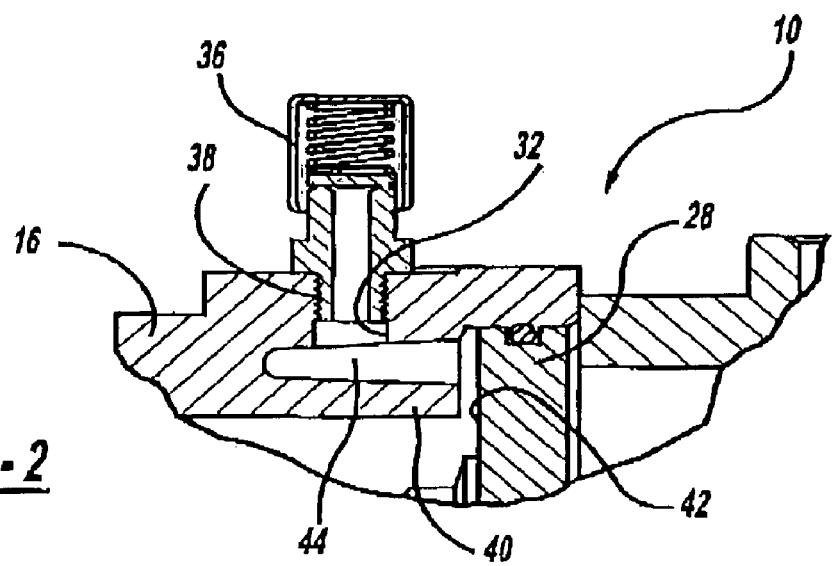
FIG. 2 shows a cross section of the vent system according to the present invention.
Figure 3:
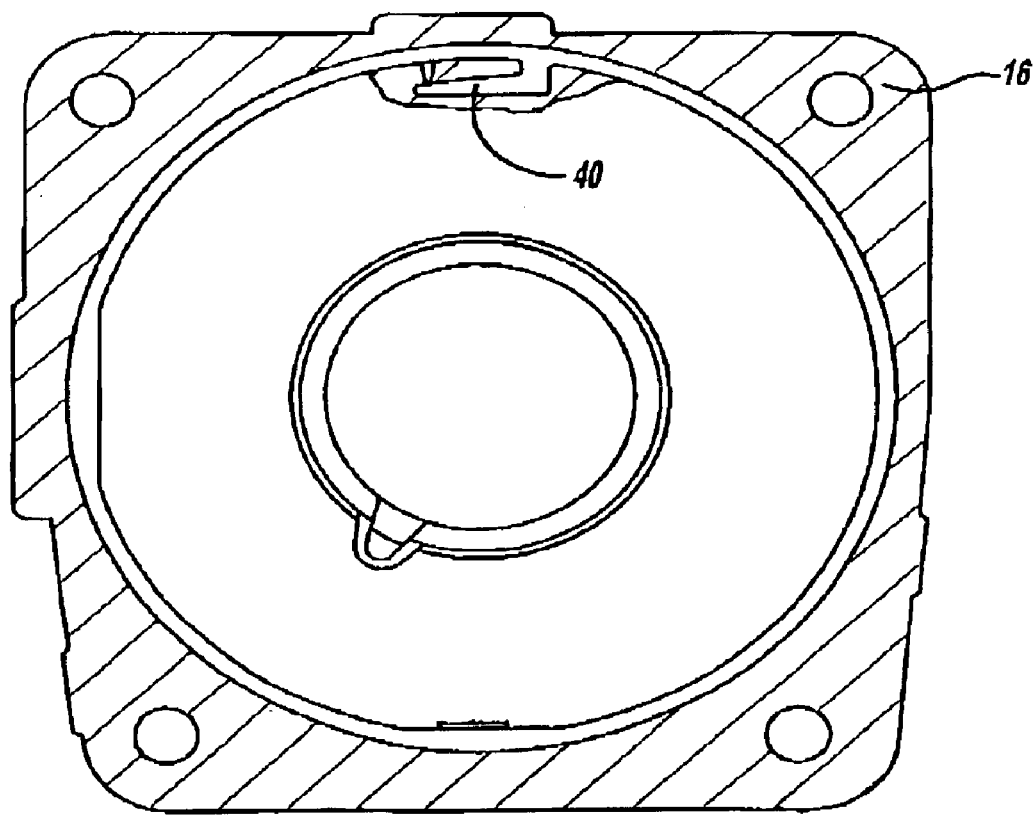
FIG. 3 shows a side view of a driveline component with the vent system attached to a top end thereof.

FIGS. 2 and 3 show the vent and baffle system 10 according to the present invention. The vent system 10 includes a spring loaded vent assembly 36 that has a threaded portion 38 on one end thereof. The threaded portion 38 is secured within a cast vent pocket or orifice 32 in the top portion of the housing 16 of the driveline module 14. The cast vent pocket 32 includes a threaded inner surface to interact with and mate with the threads on the spring loaded vent assembly 36. The spring loaded vent assembly 36 allows the housing 16 to be sealed from the outside environment and contaminants. The vent assembly 36 prevents the ingress of water, road grime and other contaminants into the housing 16 of the rear driveline module 14. Any water or other contaminants that enter the driveline module 14 inner chamber will reduce the longevity and durability of the working parts, causing premature failure of the driveline module 14 and driveline system. These premature failures occur from increased temperatures and pressure, which also reduce the lubricating properties of the lubricant. The vent assembly 36 having the spring loaded portion allows the housing 16 of the rear driveline module 14 to build a predetermined amount of pressure before the vent 36 will open to allow for venting to the outside atmosphere. The spring loaded venting assembly 36 will reduce the possibility of fluid expulsion from the rear driveline module 14 by providing approximately a 0.75 lbs. per sq. in (PSI) of resistance to venting to the outer atmosphere. It should be noted that this is an approximate PSI resistance to venting and that any venting resistance from as low as 0.1 PSI to 10 PSI may be used in the driveline module venting and baffle system. It should further be noted that the spring loaded venting assembly 36 is used in the preferred embodiment but that any other type of vent known in the art may be used such as any mechanical or electrically controlled, ie. a solenoid type vent, also may be used.

The vent and baffle system 10 also includes a vent baffle 40. The vent baffle 40 extends from a top surface of the oil housing 16 and forms an L shape in the housing 16 as can be seen in FIG. 3. The vent baffle 40 will prevent fluid from contacting the vent orifice 32 in the oil housing 16 under operating conditions of the automotive vehicle. The vent baffle 40 is angled or drafted in a first and second direction. The first direction being towards the rearward portion of the housing 16 and the second towards the side portion of the housing 16 with relation to the top of the oil housing 16. This angle will allow any lubricating fluid that enters the baffle system 10 to drain from the baffle 40 back into the oil housing 16 sump area. The angle in the preferred embodiment is approximately, 1 to 2 degrees from the top surface of the oil housing 16 in both the rearward and side direction. The vent baffle 40 is place directly adjacent or across from the vent assembly 36 which is within the orifice of the housing 16. The position of the baffle 40 will prevent any fluid from coming in contact or near the vent assembly 36 during operation, especially high speed operations, of the rear driveline module 14. The baffle 40 will act as a shield and prevent oil from entering the vent assembly 36 or the vent orifice 32 and if any oil does come near or contact the vent assembly 36 the angled or drafted surfaces on the top of the baffle 40 will allow for the fluid to drain back into the main oil housing or sump area. It should be noted that the preferred embodiment has an L shaped baffle 40 but any other shape may be used such as long as it is capable of being easily manufactured within the inner surface of the oil housing, as necessary. In the preferred embodiment the baffle 40 is cast directly into the oil housing 16 inner surface but any other type of method such as a mechanical bond may be used to attach a separate piece to the oil housing 16 to create the baffle 40 necessary to protect the vent assembly 36.

A further element of the vent and baffle system 10 is the front face 42 of the front cartridge 28, that is used in the rear axle of the rear driveline module 14. The front cartridge 28 is static with respect to the oil housing 16 and therefore will create a stationary surface necessary to offer further protection of the vent assembly 36 from any oil expulsing itself from the rear driveline module 14 through the vent 36. The front cartridge 28 is arranged such that it is in close proximity to the vent baffle 40 in the preferred embodiment. The close proximity is to the end of the vent baffle 40. In the preferred embodiment the front cartridge 28 is within 5–10 mm of the end portion of the vent baffle 40. However, it should be noted that any distance from one millimeter up to 40 millimeters maybe used depending on the need and design of the oil housing 16 and front cartridge 28 of the driveline module. With the front cartridge 28 arranged close to the vent baffle 40 this will prevent fluid from entering the back side of the baffle 40 during operation of the rear driveline module 14. This arrangement will also provide enough clearance between the baffle 40 and the front cartridge front face 42 such that any fluid that may enter the baffle system will be able to drain, without pooling at the baffle 40, back into the sump or main oil housing 16.

The vent and baffle system 10 according to the present invention also includes an air gap 44 between the vent assembly 36 and the vent baffle 40. This air gap 44 is defined generally by an inside surface of the vent baffle 40, the outer surface of the oil housing 16 and the orifice that the vent assembly is attached to. The outer area of the air gap 44 is defined in part by the front face 42 of the front cartridge 28 of the rear driveline module 14. This air gap 44 has a size sufficient to prevent the surface tension of the fluid used to lubricate and cool the rear driveline module 14 from adhering to the surface of the baffle 40. Furthermore, the air gap 44 is of sufficient size to prevent the surface tension of the fluid from adhering to the vent assembly 36 and the orifice 32 that the vent assembly is attached thereto. An air gap 44 of sufficient size will prevent the formation of a meniscus or bubble within the air gap 44. If a meniscus is allowed to form it will prevent proper venting of any built up pressure within the rear driveline module 14 through the vent 36 to the outside atmosphere. In the preferred embodiment the air gap is approximately 8–15 mm in width however it should be noted that the width of the air gap can be anywhere from 1 mm to 25 mm depending on the design requirements ie. operational speeds along with pressures and temperatures involved in the driveline module being vented. It should be further noted that if the air gap 44 were made to small then pooling of the fluid may occur and cause greater fluid expulsion through the vent assembly 36 because of the formation of a meniscus or bubble within the baffle 40.

The vent baffle system 10 can be designed for a variety of operating conditions by adjusting the size of the air gap 44 and the proximity of the front cartridge 28 to the end of the baffle 40. Further changes can be achieved by adjusting the angle at which the baffle 40 extends in a rearward and side direction with relation to oil housing 16. By having the vent orifice 32 protected with the present invention, as shown in FIG. 2, the swirling lubricating fluid will not pass over and come in contact with the vent orifice 32 and eventually the vent assembly 36. Having the vent and baffle system 10 include a shrouded pocket in conjunction with the distance it is from the front face of the front cartridge 28 the axle will prevent fluid expulsion during the high speed driving of the automotive vehicle. The use of the angled surfaces on the top of the vent baffle 40 is optimized such that any fluid drainage will occur away from the vent system especially during any handling maneuvers of the automotive vehicle when the vent is most likely to be exposed to fluid from the sump of the oil housing 16.

It should be noted that all of the parts described above are made of a metal material but any other type of hard ceramic or composite material may be used in order to create the vent and baffle system 10. The automotive industry is trending toward lighter parts and if any sort of composite is capable of being molded into an oil housing 16 with the necessary rigidity and durability needed for a driveline system the vent and baffle system may also be designed and made of such compositions. Furthermore, the preferred embodiment is for use in a rear driveline module 14 but any other type of module such as a transmission, a power take off unit, a center differential and/or constant velocity joints that need to be vented to relieve any internal pressures developed during the high speed rotation of these devices may also include this vent and baffle system on its outer housing.

The present invention has been described in an illustrative manner. It is to be understood that the terminology which has been used is intended to be in the nature of words of description rather than of limitation.

Any modifications and variations of the present invention are possible in light of the above teachings. Therefore, within the scope of the appended claims, the present invention maybe practiced otherwise then as specifically described.

What is claimed is:

1. A vent system, said system including:
   a vent member;
   a baffle arranged across from said vent member to form a protective shield for an end thereof;
   a gap formed between said vent member and said baffle; and
   a back side deflector, said deflector arranged a predetermined distance from and perpendicular to said baffle.

2. The system of claim 1 wherein said vent member having a spring loaded portion, said spring loaded portion allows for slight pressure to be achieved until said vent member will vent to an atmosphere.

3. The system of claim 2 wherein said vent member having approximately 0.75 PSI of resistance.

4. The system of claim 1 wherein said deflector prevents fluid from entering through a backside of said baffle and to provide clearance for said fluid to drain without pooling.

5. The system of claim 1 wherein said baffle having a generally "L" shape.

6. The system of claim 1 wherein said baffle is angled in both a side direction and a rearward direction to allow fluid to drain from said baffle.

7. The system of claim 1 wherein said gap having a predetermined size to prevent a surface tension of a fluid from forming a meniscus.

8. A vent system for use in a driveline enclosure of a vehicle, the driveline enclosure having a housing and a cartridge, said system including:
- a vent secured to the housing;
- a baffle extending from the housing, said baffle adjacent to said vent and adjacent to the cartridge, the cartride engaging an inside surface of the housing; and
- a gap defined by said baffle, the housing and the cartridge.

9. The system of claim 8 wherein said vent having a spring loaded portion, said vent having a thread on one end thereof, said thread secures said vent to the housing.

10. The system of claim 9 wherein said vent having approximately 0.75 PSI of resistance until said vent opens and releases pressure to an atmosphere.

11. The system of claim 8 wherein said cartridge is a predetermined distance from said baffle to prevent fluid from entering said gap and to provide clearance for said fluid to drain from said baffle without pooling.

12. The system of claim 11 wherein said baffle having a generally "L" shape and is near or at a top of the housing.

13. The system of claim 8 wherein said baffle having an angle with respect to a top surface of the housing in a side and rear direction.

14. The system of claim 8 wherein said gap having a predetermined size to prevent a surface tension of a fluid and the formation of a meniscus.

15. A driveline module for use in a vehicle, said module including:
- a housing, said housing having an orifice at or near a top surface thereof,
- a cartridge contacting an inner surface of said housing, said cartridge is rotatably fixed with respect to said housing;
- a vent secured to said housing within said orifice;
- a baffle extending from said housing; said baffle arranged adjacent to said orifice and adjacent to said cartridge; and
- a gap between said baffle and said vent, said gap defined by said baffle, said housing and said cartridge.

16. The module of claim 15 wherein said vent having a spring loaded portion, said spring loaded portion provides approximately 0.75 PSI of resistance before venting to an atmosphere.

17. The module of claim 15 wherein said cartridge is a predetermined distance from an end of said baffle to allow fluid to drain from said gap.

18. The module of claim 15 wherein said baffle generally having a "L" shape to prevent fluid from contacting said vent.

19. The module of claim 18 wherein said baffle being angled in a side and rear direction with respect to said top surface of said housing.

20. The module of claim 15 wherein said gap having a predetermined size to prevent a surface tension of a fluid from adhering to said baffle and said vent from forming a meniscus thereon.

* * * * *